(12) United States Patent
Grönvall

(10) Patent No.: US 12,303,808 B2
(45) Date of Patent: May 20, 2025

(54) FILTER PRESS AND A FILTER PLATE COMPRESSION AND TRANSPORT RETROFITTING KIT FOR A FILTER PRESS

(71) Applicant: Metso Outotec Finland Oy, Tampere (FI)

(72) Inventor: Lars Grönvall, Trelleborg (SE)

(73) Assignee: Metso Outotec Finland Oy, Tampere (FI)

( * ) Notice: Subject to any disclaimer, the term of this patent is extended or adjusted under 35 U.S.C. 154(b) by 536 days.

(21) Appl. No.: 17/787,064

(22) PCT Filed: Dec. 15, 2020

(86) PCT No.: PCT/EP2020/086109
§ 371 (c)(1),
(2) Date: Jun. 17, 2022

(87) PCT Pub. No.: WO2021/122519
PCT Pub. Date: Jun. 24, 2021

(65) Prior Publication Data
US 2023/0032206 A1    Feb. 2, 2023

(30) Foreign Application Priority Data

Dec. 20, 2019 (EP) ..................... 19218688
Dec. 20, 2019 (EP) ..................... 19218694

(51) Int. Cl.
*B01D 25/34* (2006.01)
*B01D 25/19* (2006.01)
*B01D 25/32* (2006.01)

(52) U.S. Cl.
CPC ........... *B01D 25/343* (2013.01); *B01D 25/19* (2013.01); *B01D 25/322* (2013.01)

(58) Field of Classification Search
CPC .. B01D 25/1645; B01D 25/19; B01D 25/164; B30B 1/18; B30B 1/24; B30B 9/06; B30B 9/045
See application file for complete search history.

(56) References Cited

U.S. PATENT DOCUMENTS

| 4,819,786 A | 4/1989 | Tanaka et al. |
| 8,512,560 B2 | 8/2013 | Paschedag |

(Continued)

FOREIGN PATENT DOCUMENTS

| CL | 43659 | 1/1997 |
| CL | 47776 | 1/1997 |

(Continued)

OTHER PUBLICATIONS

Office Action for European Patent Application No. 20824232.1, dated Jun. 29, 2023.

(Continued)

*Primary Examiner* — Bradley R Spies
*Assistant Examiner* — Jeannie McDermott
(74) *Attorney, Agent, or Firm* — Andrus Intellectual Property Law, LLP

(57) ABSTRACT

A filter press for separating solid components from liquid components of a slurry. The filter press includes a compression system coupled to a stationary pressure plate of the filter press. The compression system includes at least one electrically operated compression actuator having a planetary screw assembly, and a transport system coupled to a displaceable pressure plate of the filter press. The transport system includes at least one electrically operated transport actuator having a rack and pinion drive assembly. The compression system rigidly connects to the transport system so as to form, for each respective pair of compression actuators and transport actuators, a common actuator link (Continued)

which extends linearly from the stationary pressure plate to the displaceable pressure plate along the longitudinal dimension. A retrofitting kit for a filter press, a method for replacing an existing compression and transport system for a filter press and a method for controlling a filter press are set forth.

25 Claims, 9 Drawing Sheets

(56) References Cited

U.S. PATENT DOCUMENTS

| | | | |
|---|---|---|---|
| 2011/0147296 | A1 | 6/2011 | Paschedag |
| 2012/0048791 | A1* | 3/2012 | Tongiani ............. B01D 25/164 210/231 |

FOREIGN PATENT DOCUMENTS

| | | |
|---|---|---|
| CL | 47845 | 12/2008 |
| CL | 53363 | 8/2011 |
| CL | 64556 | 4/2020 |
| EP | 3473319 | 4/2019 |
| EP | 3473319 A1 | 4/2019 |
| EP | 3838367 A1 | 6/2021 |
| EP | 3838368 A1 | 6/2021 |
| IN | 215462269 U | 1/2022 |
| KR | 100983364 B1 | 9/2010 |
| KR | 101098619 B1 | 12/2011 |
| KR | 101898640 B1 | 9/2018 |

OTHER PUBLICATIONS

Search Report and Office Action for Chilean Patent Application No. 202201640, dated Mar. 18, 2024.
Search Report and Office Action for Chilean Patent Application No. 202201640, dated Sep. 25, 2024.
International Search Report for PCT Application No. PCT/EP2020/086109, mailed Mar. 2, 2021.
International Preliminary Report for PCT Application No. PCT/EP2020/086109, mailed Nov. 26, 2021.
Search Report for corresponding Chinese Patent Application No. 202011501519X dated Apr. 22, 2022.
Extended European Search Report for priority Application No. 19218688.0 mailed May 26, 2020.
Extended European Search Report for priority Application No. 19218694.8 mailed May 28, 2020.

* cited by examiner

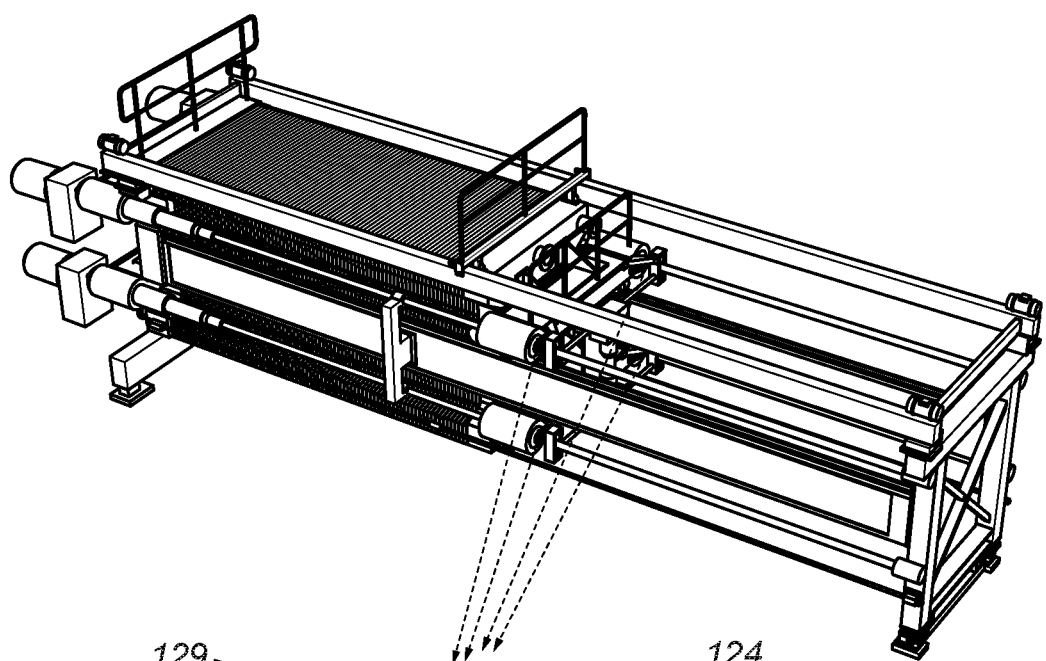
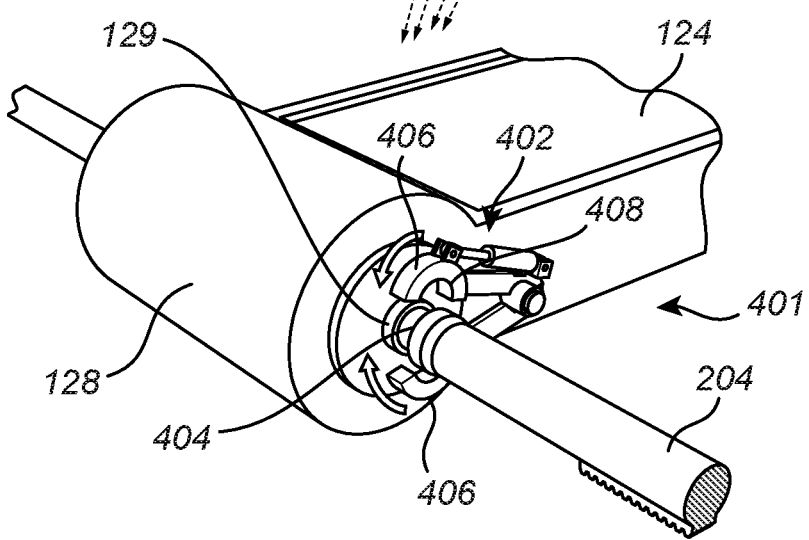
Fig. 4A
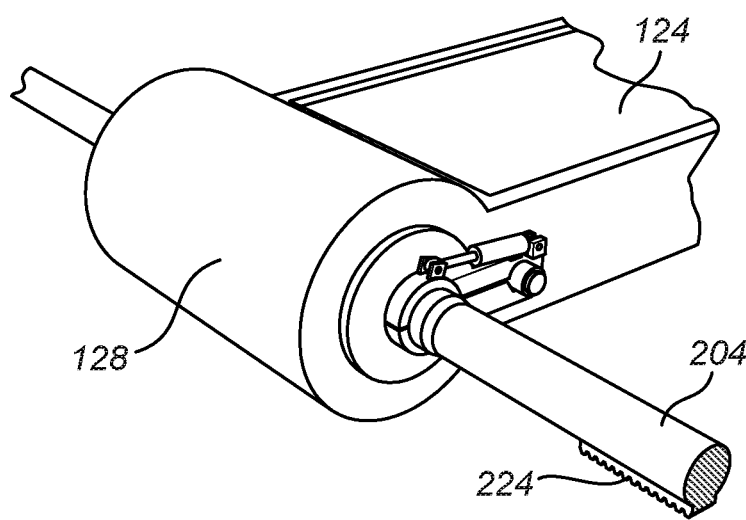
Fig. 4B

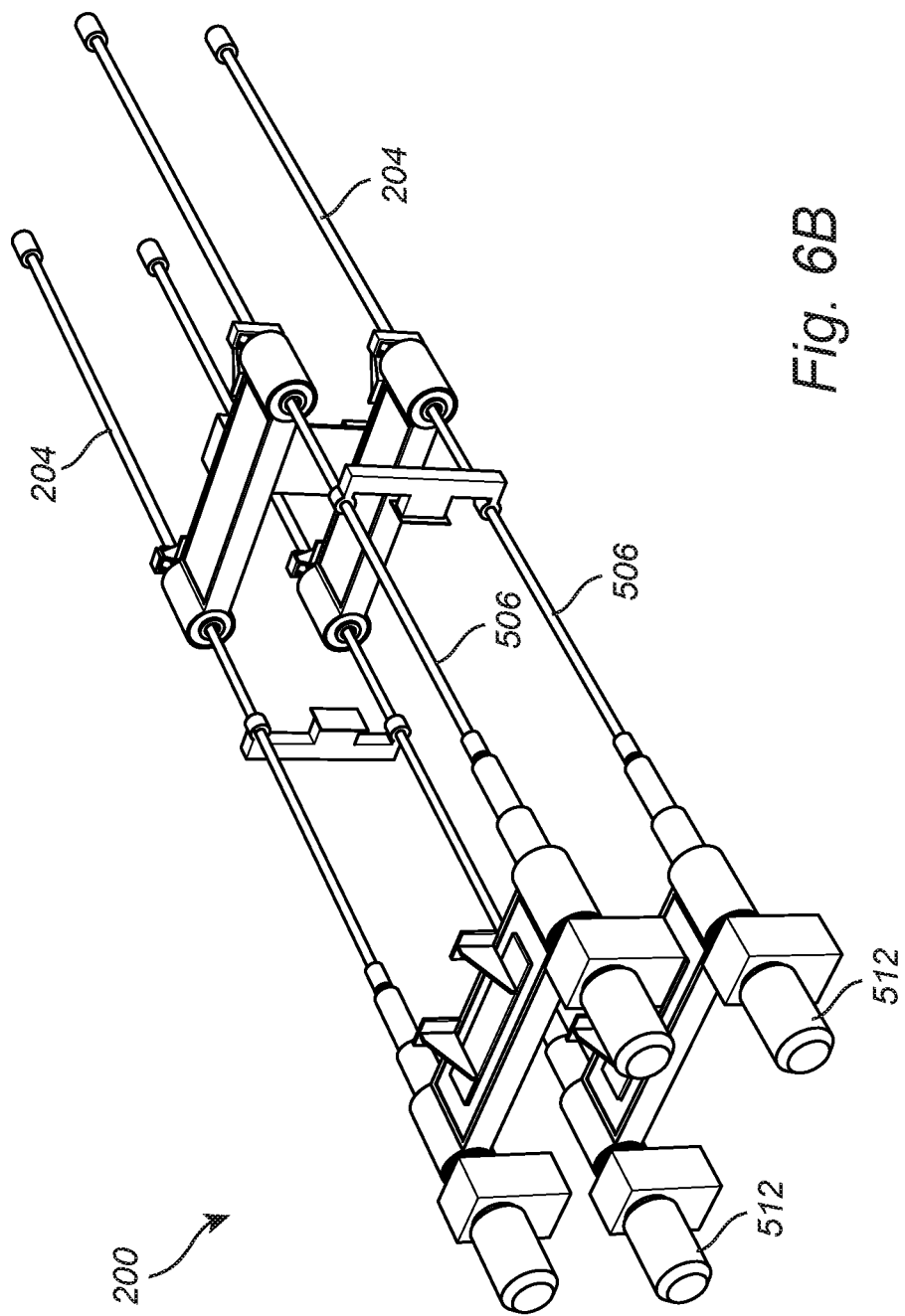

_US 12,303,808 B2_

FILTER PRESS AND A FILTER PLATE COMPRESSION AND TRANSPORT RETROFITTING KIT FOR A FILTER PRESS

CROSS-REFERENCE TO RELATED APPLICATIONS

This application is the U.S. national stage application of International Application PCT/EP2020/086109, filed Dec. 15, 2020, which international application was published on Jun. 24, 2021, as International Publication WO 2021/122519 A1 in the English language. The International Application claims priority of European Patent Application No. 19218688.0, filed Dec. 20, 2019 and European Patent Application No. 19218694.8, filed Dec. 20, 2019.

FIELD OF THE INVENTION

The present invention relates to a filter press and a filter plate compression and transport retrofitting kit for a filter press. The present 5 invention further relates to a method for controlling a filter press and a method for replacing an existing compression and transport system for a filter press.

BACKGROUND ART

One method of filtering slurries having relatively high concentrations of solid matter uses an apparatus known as a filter press, which operates under a displacement filtering principle. The filter press utilizes a series of filter plates which are placed adjacent to one another and a closing pressure is exerted on the filter plates sealing them tightly together. Slurry such as mineral slurry or pulp is introduced through an inlet to fill all of the individual spaces, the filter chambers, between each pair of filter plates and a part of the liquid component, the filtrate is expelled. The filter membranes of the filter chambers are then activated to compress the filter cakes. Then, compressed air or gas or liquid is introduced to drive out more liquid component by displacement, whereby the solid particulate matter is retained. The filtrate is led to an outlet where it is discharged. The solid particulate cake remaining in each individual space after the filter cycle must be removed in preparation for a subsequent filter cycle.

Conventional filter presses are typically configured with hydraulic cylinders for transport and closing of the filter presses. Document WO2009/079673 describes such a filter press having filter plates, a pressure plate that can be moved by means of a hydraulic cylinder mounted on a separate sliding carriage and which presses the filter plates against one another during the filtration process. The sliding carriage can be moved by means of a drive unit mounted on the sliding carriage thereby opening and closing the filter plate assembly.

The conventional systems for transport and compression are associated with several drawbacks. There is thus a need in the art for an improvement in this area. Moreover, many filter presses which are already in use at various sites, such as within mining etc. are functioning to satisfaction in many other aspects.

European patent application EP 3 473 319 A1 discloses a filter plate assembly and method for separating the solid components from the liquid components of a slurry.

SUMMARY

It is an object to mitigate, alleviate or eliminate one or more of the above-identified deficiencies in the art and disadvantages singly or in any combination and solve at least the above mentioned problem.

According to a first aspect, these and other problems are solved in full, or at least in part, by a filter plate compression and transport retrofitting kit for a filter press,
wherein the filter press comprises a stationary pressure plate, a displaceable pressure plate and a plurality of filter plates oriented perpendicular to a longitudinal dimension of the filter press, the retrofitting kit comprising:
a stationary support structure configured to couple to the stationary pressure plate,
a displaceable support structure configured to couple to the displaceable pressure plate,
a compression system, coupled to the stationary support structure, the compression system comprising at least one electrically operated compression actuator comprising a planetary screw assembly, wherein the compression system is configured to provide a closing pressure to the filter plates, and
a transport system coupled to the displaceable support structure, the transport system comprising at least one electrically operated transport actuator comprising a rack and pinion drive assembly, and
wherein the compression system rigidly connects to the transport system so as to form, for each respective pair of compression actuators and transport actuators: a common actuator link which extends linearly from the stationary support structure to the displaceable support structure along the longitudinal dimension.

The retrofitting kit may be advantageous as it allows for replacing conventional compression and transport arrangements of a filter press with an entirely electrically operated and controlled compression and transport arrangement. Thus there is no longer a need for hydraulic systems relying on hydraulic cylinders for displacing the displaceable pressure plate. Replacing a hydraulic system with an electric system is associated with several advantages. On conventional filter presses the amount of oil required to operate the hydraulic cylinders is excessive during the transport of the filter plates since they are equipped with the same power along the entire stroke. Furthermore, the usage of large quantities of oil is not good for the environment, the hydraulic oil is costly and the handling of the oil requires additional work. Moreover, in case of oil leakage, the end product, the filter cakes, may be contaminated. Therefore, the retrofitting kit according to the invention is particularly advantageous in that it does not require any oil and is therefore environmentally sustainable.

In conventional filter presses the procedure of opening and closing of the filter plates takes considerable time since large quantities of oil have to be pumped through tubes and pipes to supply the hydraulic cylinders. In particular, opening and closing of the filter plates using the closing cylinder takes considerable time because the closing cylinder is designed for high closing pressure, but not for rapid piston movement. Furthermore, if the closing cylinder is used for opening the filter plates, the press volume is limited because only one limited cylinder stroke can be realized. A long cylinder stroke also necessitates large quantities of oil and exposes large areas of the closing cylinder piston rod to contamination from falling filter cake. Moreover, a long piston renders mechanical challenges since the weight of the piston may result in deflection or bending of the piston.

However, for a filter press equipped with the retrofitting kit according to the present disclosure, both the transport of the filter plates and the closing operation of the filter plates are electrically driven. Therefore, the cycle time for completing a full work cycle is significantly reduced. This is because the displaceable pressure plate is driven by a separate system, the transport system, which allows for higher speeds when transporting the filter plates between the open position where the filter plates are emptied and the closed position and vice versa. In particular, the speed of the displaceable pressure plate may be adjustable and variable such that the displaceable pressure plate can be transported along side beams of the filter press with different speed depending on the circumstances.

Furthermore, substantial energy savings can be achieved in replacing conventional solutions for the retrofitting kit on existing filter presses since both the transport system and the compression system are electrically driven. Another advantage of the retrofitting kit used on a filter press is that the number of filter plates may be almost unlimited. This is because the transport of the filter plates is performed by the transport system based on a rack and pinion assembly. This solution allows for drive unit(s) to be mounted on the displaceable support structure which in turn allows the displaceable pressure plate to be displaced with high speed along the side beams. Since the drive unit comprises an electrical motor the supplied power and transport speed can easily be adapted to the number of filter plates in comparison to conventional filter presses where hydraulic cylinders with limited power are used for transporting the filter plates.

A further advantage of the retrofitting kit is that the forces exerted on the displaceable support structure (and thus the displaceable pressure plate) by the transport system will be spatially collinear with the forces exerted on the displaceable support structure (and thus the displaceable pressure plate) by the compression system. This advantage occurs due to the geometry of the common actuator link, which extends linearly from the stationary support structure to the displaceable support structure along the longitudinal dimension. This allows for a better and more reliable control of the displacement of the displaceable pressure plate. Also, it allows for the transport system to act as a locking mechanism to prevent a displacement of the displaceable support structure with respect to the transport system. By preventing the rack and pinion assembly from moving, e.g. by providing a brake system acting on the rack and pinion assembly, the displaceable pressure plate can be held in a fixed position with respect to the transport system along the exact same line along which the compression system exert its forces during a compression of the filter plates.

A further advantage of the retrofitting kit is that providing the common actuator links makes it easier to manufacture the kit as well as mount the kit on a filter press. This advantage occurs because the transport system and the compression system will be essentially self-contained, i.e. the retrofitting kit may be operated also without being mounted on the filter press. As the compression system directly connects to the transport system as a common actuator link, the mechanical parts defining the common actuator link do not have to be physically connected to the filter press. This means they can be manufactured and assembled with the support structures also without having the filter press present.

The term "coupled" should be interpreted broadly in that the term does not rule our intermediate elements or assemblies located between the coupled features. This implies that the stationary support structure may for some embodiments be arranged to be directly attachable to the stationary pressure plate, e.g. by bolts or screws. For alternative embodiments, the stationary support structure may be arranged to be directly attachable to a further element, or assembly of further elements, disposed in between the stationary support structure and the stationary pressure plate. Such further elements, or assembly of further elements may be used e.g. for angular adjustments of the stationary pressure plate. The same applies for the displaceable support structure and the displaceable pressure plate.

The common actuator link couples to the stationary support structure at a first end thereof and couples to the displaceable support structure at a second end thereof. The common actuator link thus links the stationary support structure with the displaceable support structure. The common actuator link should not be construed as comprising all parts of the compression system and/or the transport system. The common actuator link is the geometrical linear extension formed by parts of the compression system and/or the transport system. Other parts of the compression system and/or the transport system may be located elsewhere.

The stationary pressure plate and the displaceable pressure plate are each arranged so as to extend substantially vertically. This implies that each filter plate of the plurality of filter plates is also arranged to so as to extend substantially vertically.

The compression system connecting to the transport system may comprise: the compression system being fixedly, or rigidly, attached to the transport system.

The compression system and the transport system may define at least a part of a displacing arrangement of the filter press. The displacing arrangement may link the stationary support structure with the displaceable support structure. The displacing arrangement may be configured to provide kinetic energy to the displaceable support structure for displacing the displaceable pressure plate along the longitudinal dimension. In other words, the displacing arrangement may comprise the compression system and the transport system.

The stationary support structure may comprise one element but may alternatively comprise more than one element. The displaceable support structure may comprise one element but may alternatively comprise more than one element.

The plurality of filter plates may be oriented at right angles to the longitudinal dimension and distributed along the longitudinal dimension between the stationary pressure plate and the displaceable pressure plate of the filter press.

The compression system and/or the transport system may be configured to displace the displaceable pressure plate by converting rotational motion into linear motion.

The compression system may be configured to convert rotary drive into an axially directed force. The compression system may be configured to convert rotary drive into an axially directed pulling force or an axially directed pushing force.

The transport system may be configured to displace the displaceable pressure plate in response to rotation motion of at least one tooth gear of the rack and pinion drive assembly.

The compression system may be configured to displace the displaceable pressure plate by displacing the displaceable pressure plate in response to rotation motion of the planetary screw assembly.

The compression system and/or the transport system may be configured to provide kinetic energy to the displaceable support structure for displacing the displaceable pressure plate along the longitudinal dimension by generating an axially directed force which is exerted on the displaceable support structure.

The planetary screw assembly is configured to converts rotational motion into linear motion and is particularly suitable to be used in high-precision, high-speed, heavyload, long-life and heavy-use applications such as for use on a filter press. Thus, a rotary drive applied to the main threaded shaft is converted into an axially directed force. The necessary closing pressure needed for compressing the plurality of filter plates can thus be achieved by electrical drive means instead of hydraulic cylinders.

The displaceable support structure may comprise at least one guide element configured to slidably engage with respective one of the common actuator links. The at least one guide element may be cylinder-shaped. The at least one guide element may present a trough-hole for receiving the common actuator link. The at least one guide element may be arranged on the displaceable support structure so as to keep a fixed angular relationship between the common actuator link and the displaceable support structure independent on the position of the displaceable support structure along the longitudinal dimension.

The displaceable pressure plate may be carried by a support carriage configured to be linearly displaceable along the longitudinal dimension. The support carriage may be displaceable by means of a plurality of support wheels configured to roll on top of the longitudinally extended side beams of the filter press. The support carriage may thus support and carry the displaceable pressure plate. Thus, it is understood that the displaceable support structure may be attached, or coupled, directly to the displaceable pressure plate, which in turn may be carried by the support carriage. Alternatively, the displaceable support structure may be attached, or coupled, directly to the support carriage.

According to some embodiments, the compression system comprises two compression actuators and the transport system comprises two transport actuators, each arranged such that, when mounted on the filter press, the corresponding two common actuator links formed by the respective pairs of compression actuators and transport actuators will be located on opposite lateral sides of the filter press.

This may be advantageous at it allows for a more uniform distribution of forces as compared to embodiments presenting only one common actuator link. A more uniform distribution of forces allows for using less heavy and strong mechanical parts and also reduces the risk of jams. Moreover, using more than one common actuator link allows for controlling actuator links individually. Even if a default operation of a filter press may require the actuator links to be operated synchronously to keep the displaceable pressure plate parallel to the stationary pressure plate throughout the displacement, there may be occasions where it would be beneficial to exert a stronger force using one of the common actuator links than the other one, e.g. due to a non-uniform distribution of slurry between the filter plates, or if the plurality of filter plates, when the filter plates being in abutment with each other, present a certain difference in thickness along the longitudinal dimension.

According to some embodiments, the compression system comprises four compression actuators and the transport system comprises four transport actuators, each arranged such that, when mounted on the filter press, the corresponding four common actuator links formed by the respective pair of compression actuators and transport actuators mutually will be both laterally and vertically spaced from each other so as to define a pair of lower common actuator links and a pair of upper common actuator links.

As appreciated by the person skilled in the art, these embodiments are associated with similar advantages as the previously disclosed embodiments presenting two common actuator links: Using four common actuator links, allows for an even more uniform distribution of forces than embodiments presenting two common actuator links. Also, four common actuator links, if operated individually, may provide an even higher degree of freedom with regards to the forces exerted on the filter plates in the region close to the common actuator links. However, these embodiments may additionally provide the advantage that the common actuator links are located in a more convenient way when the retrofitting kit is mounted on a filter press. The upper and lower pairs of common actuator links are not blocking access to the plurality of filter plates from the top, or from the sides of the filter press.

According to some embodiments, the retrofitting kit further comprises a locking system configured to lock the displaceable support structure with respect to the transport system. The locking system may be a part of the transport system. The locking system may comprise a brake system configured to prevent movement of the rack and pinion assembly. The locking system may, alternatively be a separate part of the retrofitting kit and/or a filter press.

The locking system may comprise at least one locking device adapted to form a locking engagement with a locking portion of the at least one common actuator link. each locking device may include a locking element which projects towards the locking portion of a corresponding common actuator link, the locking portion being adapted to cooperate with the locking element to achieve a locking action between them. The locking element may be configured as a longitudinally extending rod or bar. The locking element may comprise a notch or groove arranged on the outermost end of the locking element. The locking portion may present a recess for engagement with the locking element. The locking system may be arranged on the displaceable support structure. The locking portion may form a part of the compression system. Specifically, the locking portion may form a part of the second compression actuator element. The locking portion may alternatively form a part of the transport system. In such a case, the locking portion may form a part of the first transport actuator element. Thus, the locking system may be configured to lock the displaceable support structure with respect to the first transport actuator element.

According to some embodiments, the retrofitting kit further comprises, for each respective pair of compression actuators and transport actuators: one or more further support structures configured to be attachable to the filter press so as to support the respective pair of compression actuators and transport actuators traverse to the longitudinal dimension over the length of the filter press. The one or more further support structures may each present one or more through-holes for receiving a respective common actuator link. The respective common actuator link may be slidably arranged in the respective through-hole. As readily realized by the person skilled in the art, this allows for the common actuator link to be displaced in relation to the filter press during displacement of the displaceable support structure using the compression system.

The one or more further support structures may be advantageous for preventing the common actuator links to become bent due to their weight. As appreciated by the person skilled in the art, the significance of such problems will depend on the dimensions of the filter press. Thus, it is conceivable that a retrofitting kit for a large filter press, which will need a retrofitting kit operating over a relatively long displacement distance, will require a plurality of further support structures, whereas a retrofitting kit for a smaller filter press may not need any further support structures at all.

The transport system may comprise electrical driving means in correspondence with the number of transport actuators. However, a single electrical driving means may also drive several transport actuators. In embodiments having more than one transport actuator, the transport system may be configured to operate the transport actuators differently so as to exert forces of different magnitude on the filter plates. The filter plates may then be tilted or oriented in a non-vertical direction or offset in the longitudinal dimension along the side beams in correspondence to the exerted forces. This may be advantageous in that different magnitude of power can easily be applied to the actuators. Thereby it is possible to adjust the speed of each actuator individually and by that improve cycle time and ensure optimum and/or equal pressure in the closed stage.

According to some embodiments, the transport system further comprises one or more drive units arranged to be carried by the displaceable support structure for providing kinetic energy to the transport system. The one or more drive units may each comprise an electric motor. This implies that the drive unit may be arranged on the displaceable support structure such that the drive unit is displaced with the displaceable support structure. This may be advantageous as it allows for a less complicated transmission system. As previously mentioned, the transport system typically operate over considerably longer displacement distances than the compression system. Carrying the one or more drive units on the displaceable support structure thus may keep the one or more drive units in the reference frame of the displaceable pressure plate at all times.

According to some embodiments, each compression actuator of the at least one compression actuator comprises:
 a first compression actuator element rotationally arranged in the stationary support structure, and
 a second compression actuator element which is coupled to the first compression actuator element by means of the planetary screw assembly such that the second compression actuator element displaces along the longitudinal dimension in response to a rotation of the first compression actuator element about the longitudinal dimension.

This may be advantageous as it allows the second compression actuator element to be fixed in relation to the transport system at all times. This significantly simplifies construction and allows a more stable mechanical coupling between the compression system and the transport system at the common actuator links.

The first compression actuator element may be a compression system drive shaft. The compression system drive shaft may be arranged to rotate around a compression system drive shaft axis by means of a compression system drive unit. The compression system drive shaft axis may extend along the longitudinal dimension. The compression system drive unit may be an electrical motor. The compression system drive shaft may present a threading. This implies that the compression system drive shaft functions as a planetary roller screw shaft.

The second compression actuator element may have a cylindrical cross section and extend linearly along the longitudinal dimension. The second compression actuator element may have a first end and a second end. The second compression actuator element may comprise a hollow cylindrical portion presenting an opening at the first end thereof. The compression system drive shaft may be received in the opening. The compression system drive shaft may be arranged coaxially with the second compression actuator element. The hollow cylindrical portion may present an internal threading. This implies that the hollow cylindrical portion may function as a planetary roller nut.

The planetary screw assembly may comprise a plurality of rollers. The plurality of rollers is radially arrayed around the compression system drive shaft and encapsulated by the hollow cylindrical portion of the second compression actuator element. The thread of the compression system drive shaft is typically identical to the internal thread of the hollow cylindrical portion. The rollers typically have a single-start thread with convex flanks that limit friction at the rollers' contacts with the compression system drive shaft and the hollow cylindrical portion of the second compression actuator element. The rollers typically orbit the compression system drive shaft as they spin and are therefore often termed planetary rollers.

Alternatively, the planetary screw assembly may comprise a plurality of balls radially arrayed around the compression system drive shaft and encapsulated by the hollow cylindrical portion of the second compression actuator element. The planetary screw assembly based on the plurality of balls generally functions in the same manner as the planetary screw assembly based on the plurality of rollers. The second compression actuator element is configured to have a constant angular position with respect to the compression system drive shaft axis. This implies that the second compression actuator element does not rotate around the compression system drive shaft axis. As the compression system drive shaft rotates around the compression system drive shaft axis, the compression system drive shaft will engage with the plurality of rollers, which in turn will engage with the hollow cylindrical portion of the second compression actuator element. As appreciated by the person skilled in the art, the second compression actuator element will be linearly displaced in relation to the compression system drive shaft along the drive shaft axis (i.e. along the longitudinal dimension). The compression system drive shaft is rotationally arranged in the stationary support structure. This implies that the compression system drive shaft will not displace along the compression system drive shaft axis and consequently not either along the longitudinal dimension.

The second compression actuator element may comprise a connecting portion at the second end thereof. The connecting portion may be configured as a longitudinally extended body. The connecting portion may comprise several components coupled together to form a connection between the compression system and the locking system. The components may be releasably coupled to each other. The body of the connecting portion may be configured as a cylindrically formed shell or a partly solid component. The body may comprise other peripheral cross section such as square or octagonal. Preferably the connecting portion is concentrically arranged with the compression system drive shaft.

The compression system may comprise one or more drive units for providing kinetic energy to the displaceable support structure for displacing the displaceable pressure plate along the longitudinal dimension. The one or more drive units may comprise one or more electric motors.

According to some embodiments, each transport actuator comprises:
 a transport actuator element which presents a tooth rack, the transport actuator element being rigidly connected with the second compression actuator element, and
 a transport actuator transmission which includes a tooth gear, the transport actuator transmission being carried by the displaceable support structure, and wherein the transport actuator element is arranged in relation to the transport actuator transmission such that the tooth gear engages with the tooth rack.

This may be advantageous as it allows to obtain common actuator links which extends linearly along the longitudinal dimension with high structural integrity and to a relatively low cost.

According to some embodiments, the transport actuator transmission comprises:
- a laterally extending upper drive shaft carrying, at each end thereof, a respective tooth gear for engaging a respective tooth rack of the respective one of the upper common linear actuator links, and
- a laterally extending lower drive shaft carrying, at each end thereof, a respective tooth gear for engaging a respective tooth rack of the respective one of the lower common linear actuator links,
- wherein the upper and lower drive shafts are operated synchronously.

This may be advantageous as it allows for a more simplified transmission.

The laterally extending upper drive shaft and the laterally extending lower drive shaft may each be powered by a respective drive unit. Each drive unit may comprise an electric motor. Each drive unit may be arranged on the displaceable support structure so as to face the respective drive shaft of the laterally extending upper drive shaft and the laterally extending lower drive shaft. Each drive unit may be configured to transfer kinetic energy to the respective drive shaft by means of a drive unit transmission system, such as a gear box.

According to some embodiments, the transport actuator element is cylinder shaped having the tooth rack integrally formed on a bottom portion thereof such that the tooth rack is directed downwards.

This may be advantageous as it allows for a simplified geometry.

The transport actuator element may extend linearly between a first end and a second end thereof. The transport actuator element may, if mounted on a filter press, extend linearly to a rear end of the filter press. The transport actuator element may extend along the longitudinal dimension. The transport actuator element may be coaxial with the compression actuator drive shaft axis. The first end of the transport actuator element may be rigidly connected the second end of the second compression actuator element. The first end of the transport actuator element may be fixedly attached to the second end of the second compression actuator element. The first end of the transport actuator element may be fixedly attached to the second end of the second compression actuator element by means of a connection element. Such a connection element may be a hollow cylindrical structure configured to receive, in a first end thereof: the second end of the second compression actuator element, and, at a second end thereof: the first end of the transport actuator element.

The transport system may further comprise a rack and pinion drive support means configured to control the distance between the tooth rack and the rotational axis of the tooth gear for allowing the tooth gear to engage the tooth rack of the transport actuator element. The rack and pinion drive support means may comprise a supporting frame and a supporting roller rotationally attached on the supporting frame. The rack and pinion drive support means may be arranged on the displaceable support structure such that the tooth gear is arranged to rotate in parallel to the supporting roller and distanced therefrom such that a gap is formed between the tooth gear and the supporting roller, in which gap the transport actuator element is received for engaging with the tooth rack on one side thereof, and engage with the supporting roller on an opposite side thereof.

The retrofitting kit may further comprise preventing means for preventing one or more parts of the common actuator link to rotate along the longitudinal dimension. Such a rotation may be induced by the mechanical action caused by the compression system actuator. Such preventing means may be configured to act on the common actuator link at different positions, such as on the second compression actuator element, on the first transport actuator element, or on a further element non-rotationally arranged on, or engaging with, a part of the common actuator link.

The preventing means may comprise a fixing member attached to the frame. The fixing member may be configured to be connected to the one or more parts of the common actuator link. The fixing member may be configured to permit axial displacement of one or more parts of the common actuator link, such as the second compression actuator element and the first transport actuator element, along the longitudinal dimension in response to displacing the support structure using the compression system.

It is also conceivable that the locking system further functions as a preventing means since the locking element may be adapted to perform a locking action with the locking portion of the common actuator link which does not permit rotation of the one or more parts of the common actuator link.

It is also conceivable that the one or more further support structures further functions as preventing means. This could be achieved for example by the one or more through-holes having a non-circular cross section, such as e,g, a square cross section. This solution implies that a portion of the common actuator link arranged to pass through the through-hole also must have a non-circular cross section.

According to a second aspect there is provided a method for replacing an existing compression and transport system for a filter press, the method comprising:
- dismantling the existing compression and transport system of the filter press,
- providing a retrofitting kit according to the first aspect,
- coupling, or attaching, the stationary support structure to the stationary pressure plate of the filter press,
- coupling, or attaching, the displaceable support structure to the displaceable pressure plate of the filter press.

According to a third aspect there is provided a use of a retrofitting kit according to the first aspect.

According to a fourth aspect there is provided a filter press for separating solid components from liquid components of a slurry, the filter press comprising:
- a frame;
- a stationary pressure plate being coupled to the frame;
- a displaceable pressure plate being displaceable along a longitudinal dimension of the filter press;
- a plurality of filter plates oriented perpendicular to the longitudinal dimension of the filter press;
- a compression system coupled to the stationary pressure plate, wherein the compression system comprises at least one electrically operated compression actuator comprising a planetary screw assembly, and
- a transport system coupled to the displaceable pressure plate, wherein the transport system comprises at least one electrically operated transport actuator comprising a rack and pinion drive assembly, and
- wherein the compression system rigidly connects to the transport system so as to form, for each respective pair of compression actuators and transport actuators, a common actuator link which extends linearly from the stationary pressure plate to the displaceable pressure plate along the longitudinal dimension.

As will be appreciated by the person skilled in the art, the filter press of the fourth aspect shares at least the same advantages as previously disclosed for the retrofitting kit according to the first aspect. The same applies for dependent claims if no further details are provided herein.

The displaceable support structure may be supported by the frame to be displaceable thereon. Alternatively, the displaceable support structure may be supported indirectly, for example by means of the support carriage.

The frame of the filter press may comprise side beams. The side beams may extend linearly along the longitudinal dimension of the filter press. The side beams may act as a support for the plurality of filter plates. The side beams may further act as a support for the displaceable support structure directly and/or via the support carriage.

According to some embodiments, the filter press further comprises:
  a stationary support structure being coupled to the stationary pressure plate and to the compression system; and
  a displaceable support structure being coupled to the displaceable pressure plate and to the transport system.

According to some embodiments, the compression system comprises two compression actuators and the transport system comprises two transport actuators, each arranged such that the corresponding two common actuator links formed by the respective pairs of compression actuators and transport actuators will be located on opposite lateral sides of the filter press.

According to some embodiments, the compression system comprises four compression actuators and the transport system comprises four transport actuators, each arranged such that the corresponding four common linear actuator links formed by the respective pairs of compression actuators and transport actuators mutually will be both laterally and vertically spaced from each other so as to define a pair of lower common actuator links and a pair of upper common actuator links.

According to some embodiments, each compression actuator of the at least one compression actuator comprises:
  a first compression actuator element rotationally arranged in the stationary support structure, and
  a second compression actuator element which is coupled to the first compression actuator element by means of the planetary screw assembly such that the second compression actuator element displaces along the longitudinal dimension in response to a rotation of the first compression actuator element about the longitudinal dimension.

According to some embodiments, each transport actuator comprises:
  a transport actuator element which presents a tooth rack, the transport actuator element being rigidly connected with the second compression actuator element, and
  a transport actuator transmission which includes a tooth gear, the transport actuator transmission being carried by the displaceable support structure, and
  wherein the transport actuator element is arranged in relation to the transport actuator transmission such that the tooth gear engages with the tooth rack.

According to a fifth aspect there is provided a method for controlling a filter press,
  wherein the filter press comprises:
    a stationary pressure plate, a displaceable pressure plate and a plurality of filter plates oriented perpendicular to a longitudinal dimension of the filter press
    a compression system coupled to the stationary support structure, the compression system comprising at least one electrically operated compression actuator comprising a planetary screw assembly, wherein the compression system is configured to provide a closing pressure to the filter plates, and
    a transport system coupled to the displaceable support structure, the transport system comprising at least one electrically operated transport actuator comprising a rack and pinion drive assembly,
    wherein the compression system rigidly connects to the transport system so as to form, for each respective pair of compression actuator and transport actuator, a common actuator link which extends linearly from the stationary pressure plate to the displaceable pressure plate along the longitudinal dimension,
  the method comprising:
    displacing, by the transport system, the displaceable pressure plate in a direction towards the stationary pressure plate from an open position, at which the filter plates of the plurality of filter plates are mutually separated from each other, to a closed position, at which the filter plates of the plurality of filter plates are mutually in abutment with each other;
    locking, by a locking system, the displaceable pressure plate in relation to the transport system;
    feeding a slurry which comprises a mix of solid components and liquid components into cavities formed between mutually facing surfaces of adjacent pairs of filter plates of the plurality of filter pairs;
    displacing, by the compression system, the displaceable pressure plate in a direction towards the stationary pressure plate from the closed position to a compressed position so as to reduce the total volume of the cavities, whereby at least a part of the liquid component is forced to move from the cavities into the filter plates for separating the solid components from said at least a part of the liquid components of the slurry.

The method has certain advantages over conventional methods. By providing two distinct displacement steps separated from each other by a locking step, the method allows for a significantly reduced time for transporting the displaceable pressure plate from the open position to the closed position as compared to the hydraulic transport solutions of the art. By providing the locking step, the method achieves the effect that the compression system may act on the plurality of filters independent on the transport system. The compression step involves a relatively small displacement but at significantly higher forces as compared to the transport operation. The compression system is configured to perform this task as the compression system actuators may exert a considerably higher force than the transport system actuator.

According to some embodiments, the compression system is inactive during said displacing of the displaceable pressure plate from the open position to the closed position using the transport system, and
  the transport system is inactive during said displacing of the displaceable pressure plate from the closed position to the compressed position using the compression system.

This may be advantageous as it allows each system to operate independent of each other.

According to some embodiments, the step of displacing the displaceable pressure plate by the transport system and/or the step of displacing the displaceable pressure plate by the compression system comprises: converting rotational motion into linear motion.

According to some embodiments, the step of displacing the displaceable pressure plate by the transport system comprises: displacing the displaceable pressure plate in response to rotation motion of at least one tooth gear of the rack and pinion drive assembly.

According to some embodiments, the step of displacing the displaceable pressure plate by the compression system comprises: displacing the displaceable pressure plate in response to rotation motion of the planetary screw assembly.

According to some embodiments, the compression system comprises two compression actuators and the transport system comprises two transport actuators, each arranged such that the corresponding two common actuator links formed by the respective pairs of compression actuator and transport actuator will be located on opposite lateral sides of the filter press,
  wherein said displacing of the displaceable pressure plate by the transport system comprises: displacing said displaceable pressure plate by operating said two transport actuators in synchronization; and
  wherein said displacing of the displaceable pressure plate by the compression system comprises: displacing said displaceable pressure plate by operating said two compression actuators in synchronization.

According to some embodiments, the compression system comprises four compression actuators and the transport system comprises four transport actuators, each arranged such that the corresponding four common linear actuator links formed by the respective pairs of compression actuators and transport actuators mutually will be both laterally and vertically spaced from each other so as to define a pair of lower common actuator links and a pair of upper common actuator links,
  wherein said displacing of the displaceable pressure plate by the transport system comprises: displacing said displaceable pressure plate by operating said four transport actuators in synchronization; and
  wherein said displacing of the displaceable pressure plate by the compression system comprises: displacing said displaceable pressure plate by operating said four compression actuators in synchronization.

According to some embodiments, the method further comprises:
  displacing, by the compression system, the displaceable pressure plate in a direction away from the stationary pressure plate from the compressed position to the closed position;
  unlocking, by the locking system, the displaceable pressure plate in relation to the transport system;
  displacing, by the transport system, the displaceable pressure plate in a direction away from the stationary pressure plate from the closed position to the open position, so as to mutually separate the plurality of filter plates in relation to each other to open the cavities, thereby discharging the remaining part of the slurry from the filter press.

Effects and features of the second, third, fourth and fifth aspects are largely analogous to those described above in connection with the first aspect. Embodiments mentioned in relation to the first aspect are largely compatible with the second, third and fourth aspects.

It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein:

FIG. 4A is a perspective view of a locking system of the filter press of FIG. 1 when the locking system is in an inactive position.

FIG. 4B is a perspective view of the locking system of the filter press of FIG. 1 when the locking system is in a locking position.

FIG. 6B is a perspective view of the filter plate compression and transport retrofitting kit of FIG. 6A when viewed from a second end of the retrofitting kit.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be constructed as limited to the embodiments set forth herein; rather, these embodiments are provided for thoroughness and completeness, and to fully convey the scope of the disclosure to the skilled person.

This disclosure refers to a filter press 100 and a retrofitting kit 200 for the filter press 100. With reference to FIGS. 1-5 of the present disclosure, a filter press 100 for separating solid components from liquid components 810 of a slurry 808, preferably a mineral slurry or mineral pulp, will be discussed. With reference to FIG. 6 of the present disclosure, a compression and transport retrofitting kit 200 for a conventional filter press will be discussed. The components of the compression and transport retrofitting kit 200 may be part of the filter press 100 of the present disclosure as well. For the example embodiment disclosed herein, all structural features of the retrofitting kit 200 is also found in the filter press 100. However, it should be understood that this is an example embodiment only. Other example embodiments of the filter press according to the disclosure may lack one or more features part of the retrofitting kit 200 of the disclosure.

Figure 1:
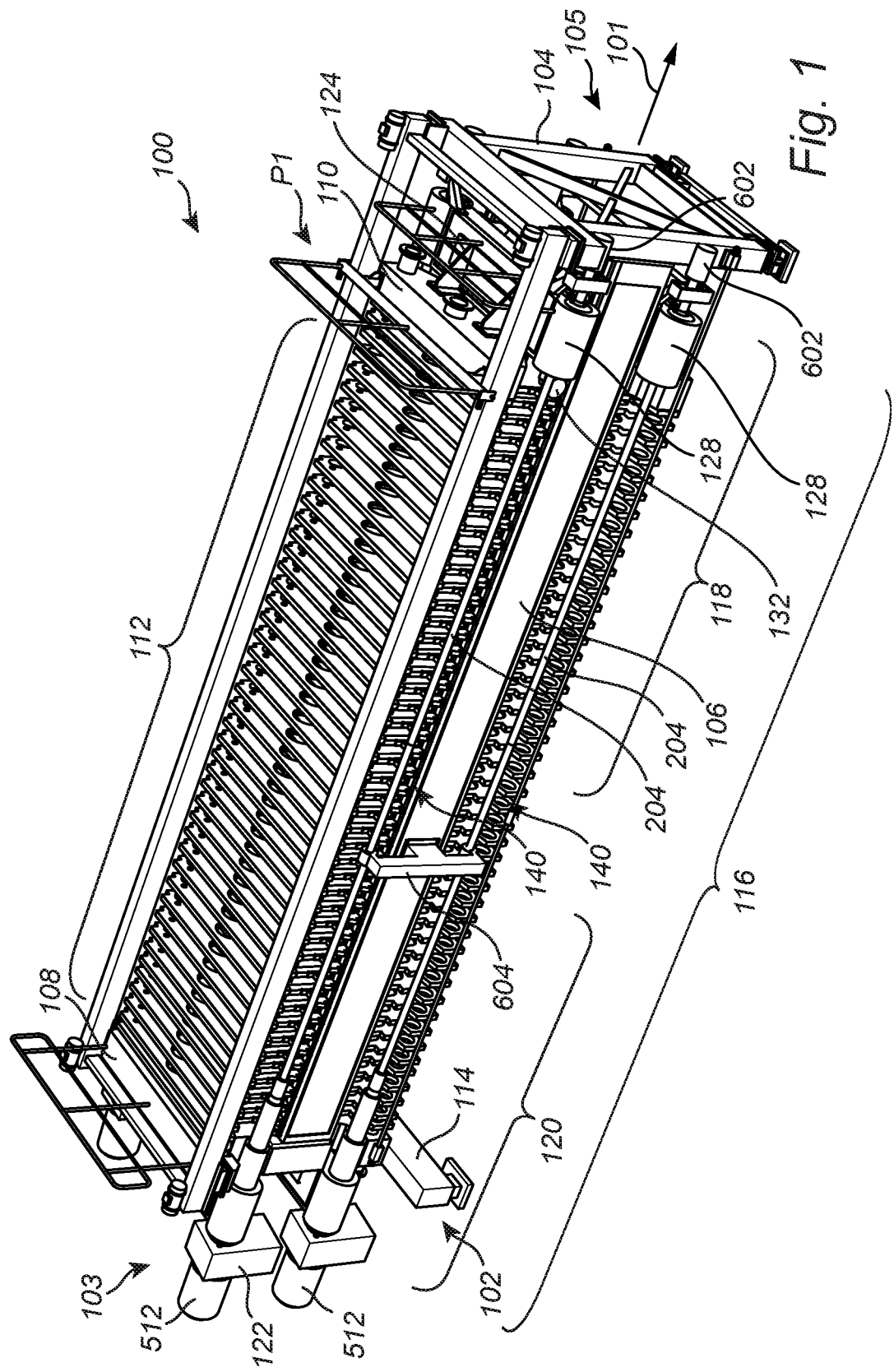
FIG. 1 is a perspective view of a filter press of the disclosure when the displaceable plate is in an open position.

FIG. 1 illustrates a perspective view of the filter press 100, wherein the filter press 100 extends along a longitudinal dimension 101 between a front end 103 and a rear end 105 of the filter press 100. In FIG. 1, the filter press 100 is illustrated in an open state.

The filter press 100 comprises a frame 102 having rear end columns 104 at the rear end 105, and front end columns 114 at the front end 103. The frame 102 further comprises longitudinally extended side beams 106 connecting the rear end columns 104 with the front end columns 114.

The filter press 100 further comprises a stationary pressure plate 108 being coupled to the frame 102 at the front end 103. The filter press 100 further comprises a displaceable pressure plate 110 being supported by the frame 102 and arranged to be displaceable along the longitudinal dimension 101.

The filter press 100 further comprises a plurality of filter plates 112 being supported by the frame 102. The plurality of filter plates 112 is oriented at right angles to the longitudinal dimension 101. The plurality of filter plates 112 is distributed along the longitudinal dimension 101 between the stationary pressure plate 108 and the displaceable pressure plate 110. A first outermost filter plate arranged next to the stationary pressure plate 108 is connected to the stationary pressure plate 108. A second outermost filter plate arranged next to the displaceable pressure plate 110 is connected to the displaceable pressure plate 110. All other filter plates of the plurality of filter plates 112 are connected to these outermost filter plates respectively, and to each other, for example by chains, building a sandwich-like arrangement.

Figure 2:
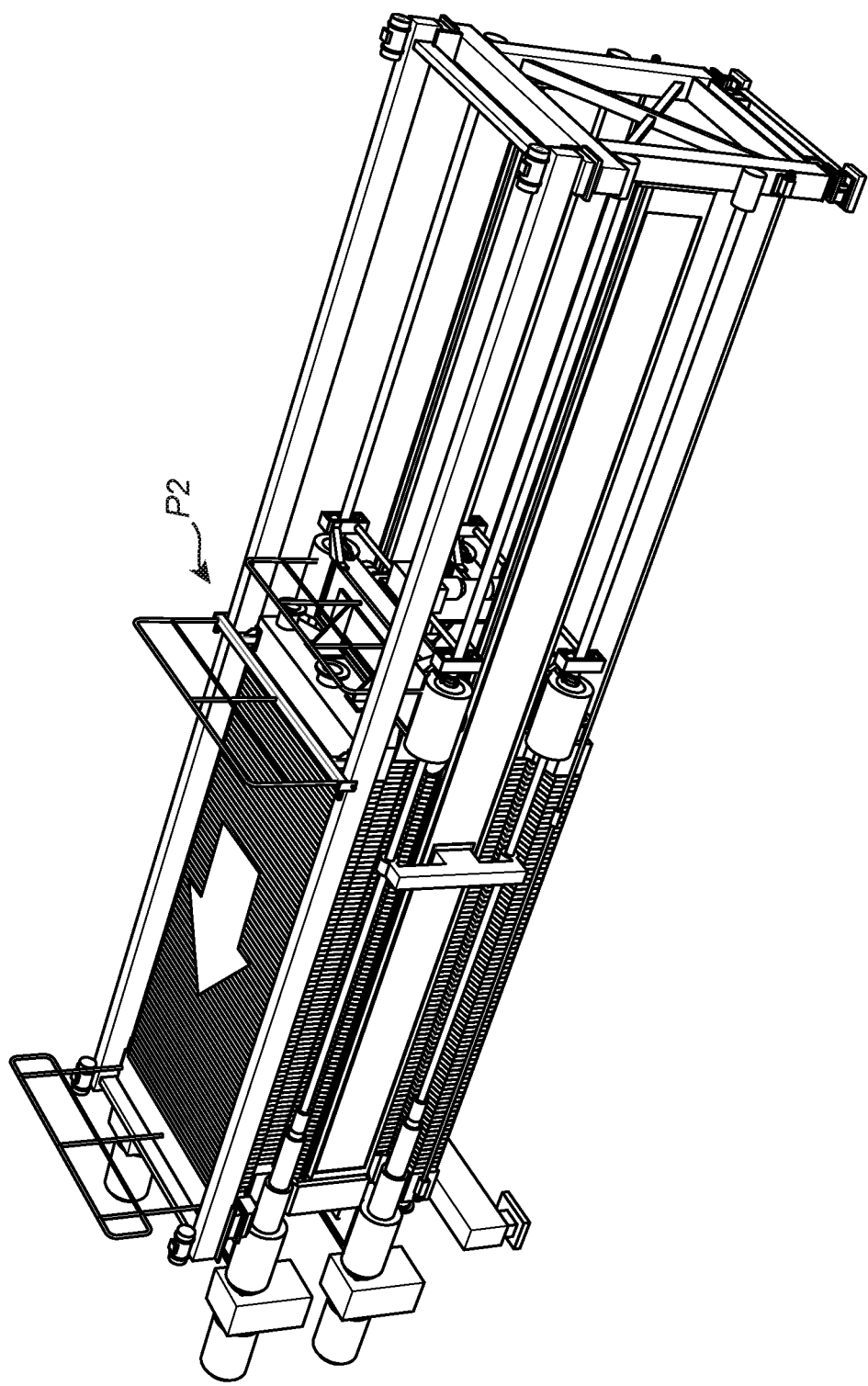
FIG. 2 is a perspective view of the filter press of FIG. 1 when the displaceable pressure plate is in a closed position.

FIG. 1 illustrates the filter press 100 in an open state. When being in the open state, the filters of the plurality of filter plates 112 are arranged mutually separated from each other. In the open state, the filter press 100 may discharge material as will be further discussed later. FIG. 2 illustrates the filter press 100 in a closed state. When being in the closed state, the filter plates 802 of the plurality of filter plates 112 are arranged mutually in abutment with each other ready for being compressed.

Figure 8A:
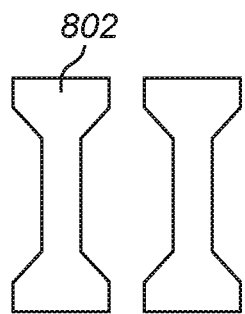
FIGS. 8A-8E are side views of two filter plates of the plurality of filter plates in different positions.
Figure 8B:
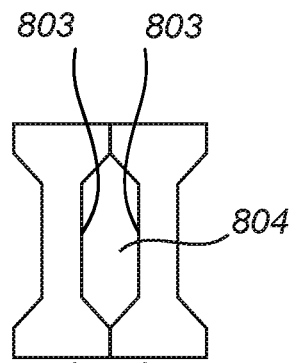
Figure 8C:
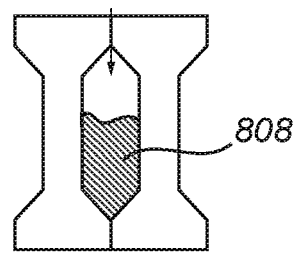
Figure 8D:
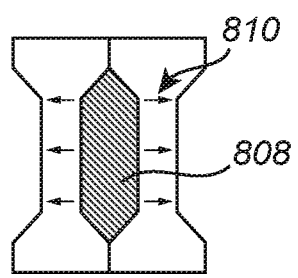

Each filter plate 802 of the plurality of filter plates 112 has a recess (not shown) on each one of its two side surfaces. A recess of a filter plate 802 creates a cavity 804 (as illustrated in FIG. 8B) together with a corresponding recess of a neighboring filter plate 802 when the plurality of filter plates 112 are mutually in abutment with each other. Each filter plate 802 of the plurality of filter plates 112 further comprises an inlet (not shown) for receiving the slurry 808 from which the solid components are to be separated from the liquid components 810, and a plurality of outlets (not shown) through which the liquid components 810 can exit (as illustrated in FIG. 8D).

The filter press 100 further comprises a displacing arrangement 116. The displacing arrangement 116 is configured to link the stationary pressure plate 108 with the displaceable pressure plate 110. The displacing arrangement 116 comprises a transport system 118 and a compression system 120.

Figure 3:
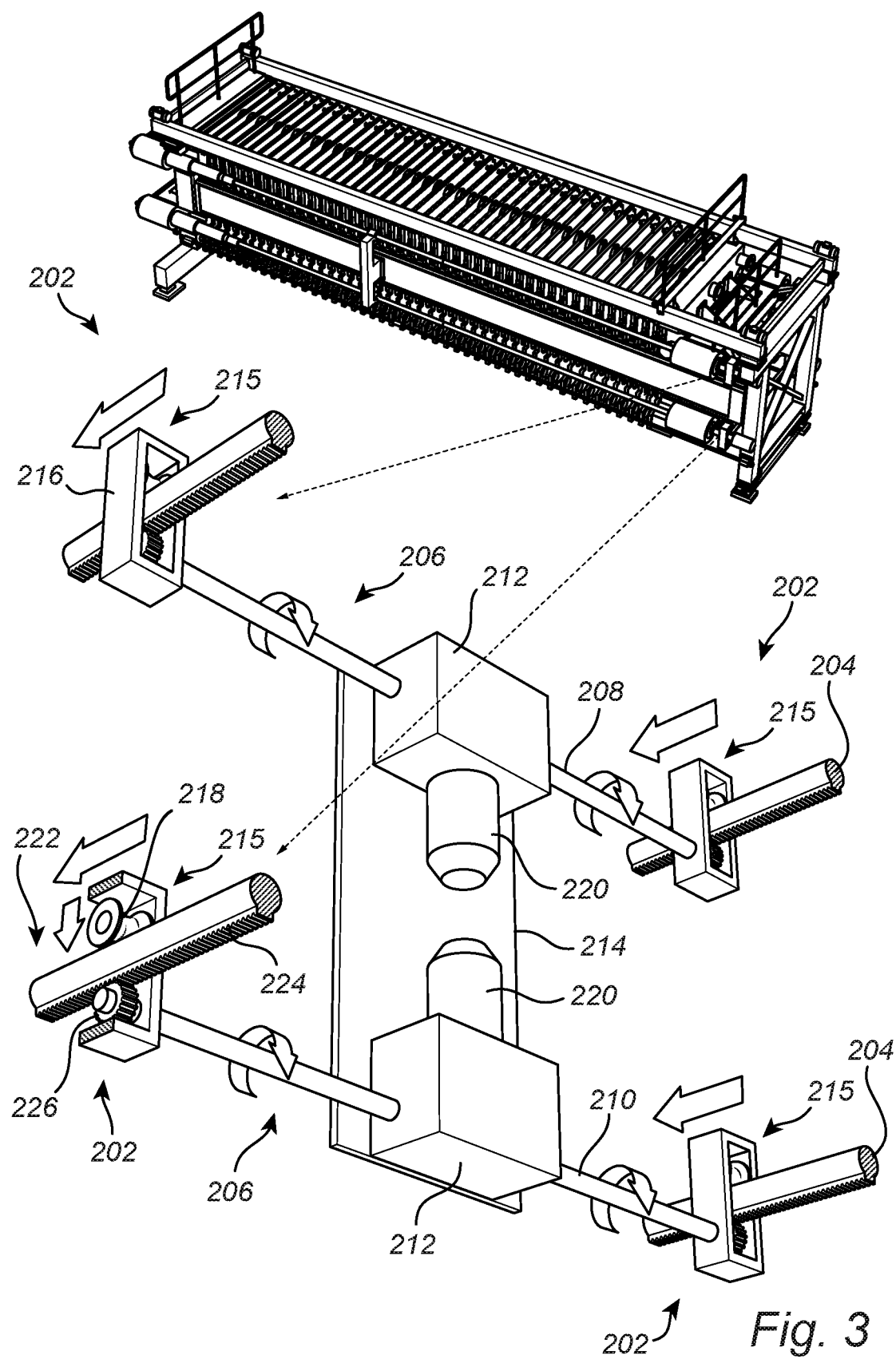
FIG. 3 is a perspective view of parts of a transport system of the filter press of FIG. 1.

The transport system 118 comprises a rack and pinion drive assembly 222, which can be seen more in detail in connection to FIG. 3. The transport system 118 is arranged to displace the displaceable pressure plate 110 between an open position P1, at which the filter press 100 is in the open state, to a closed position P2, at which the filter press 100 is in the closed state, and vice versa.

Figure 5:
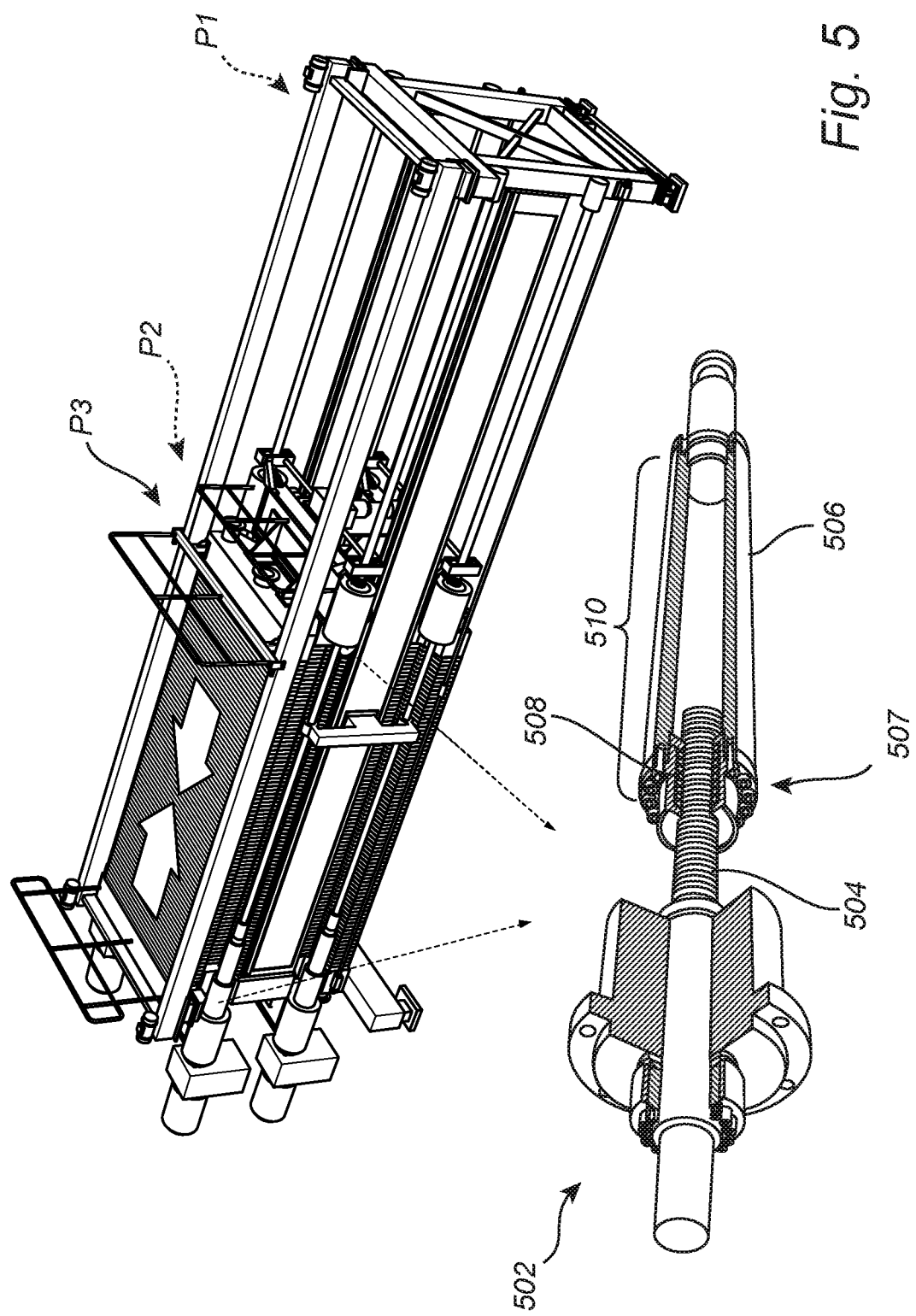
FIG. 5 is a perspective view of parts of a compression actuator of a compression system of the filter press of FIG. 1.

The compression system 120 comprises a planetary screw assembly 507, which can be seen more in detail in connection to FIG. 5. The compression system 120 is arranged to displace the displaceable pressure plate 110 from the closed position P2 to a compressed position P3, and vice versa. The compressed position P3 is illustrated in FIG. 5. The compression system 120 rigidly connects to the transport system 118 such as to form common actuator links 140 which extends linearly from the stationary pressure plate 108 to the displaceable pressure plate 110 along the longitudinal dimension 101. Thus, the transport system 118 and the compression system 120 may work together in order to provide for the displacement of the plurality of filter plates 112 of the filter press 100 in order to separate the liquid components 810 from the solid components of the slurry 808. The transport system 118 will be discussed in more detail with connection to FIGS. 3 and 4. The compression system 120 will be discussed in more detail with connection to FIG. 5.

In the example embodiment, the compression system 120 comprises four compression actuators 502 and the transport system 118 comprises four transport actuators 202. These are each arranged such that the corresponding four common linear actuator links 140 formed by the respective pairs of compression actuators 502 and transport actuators 202 mutually will be both laterally and vertically spaced from each other so as to define a pair of lower common actuator links 140b and a pair of upper common actuator links 140a.

Figure 6A:
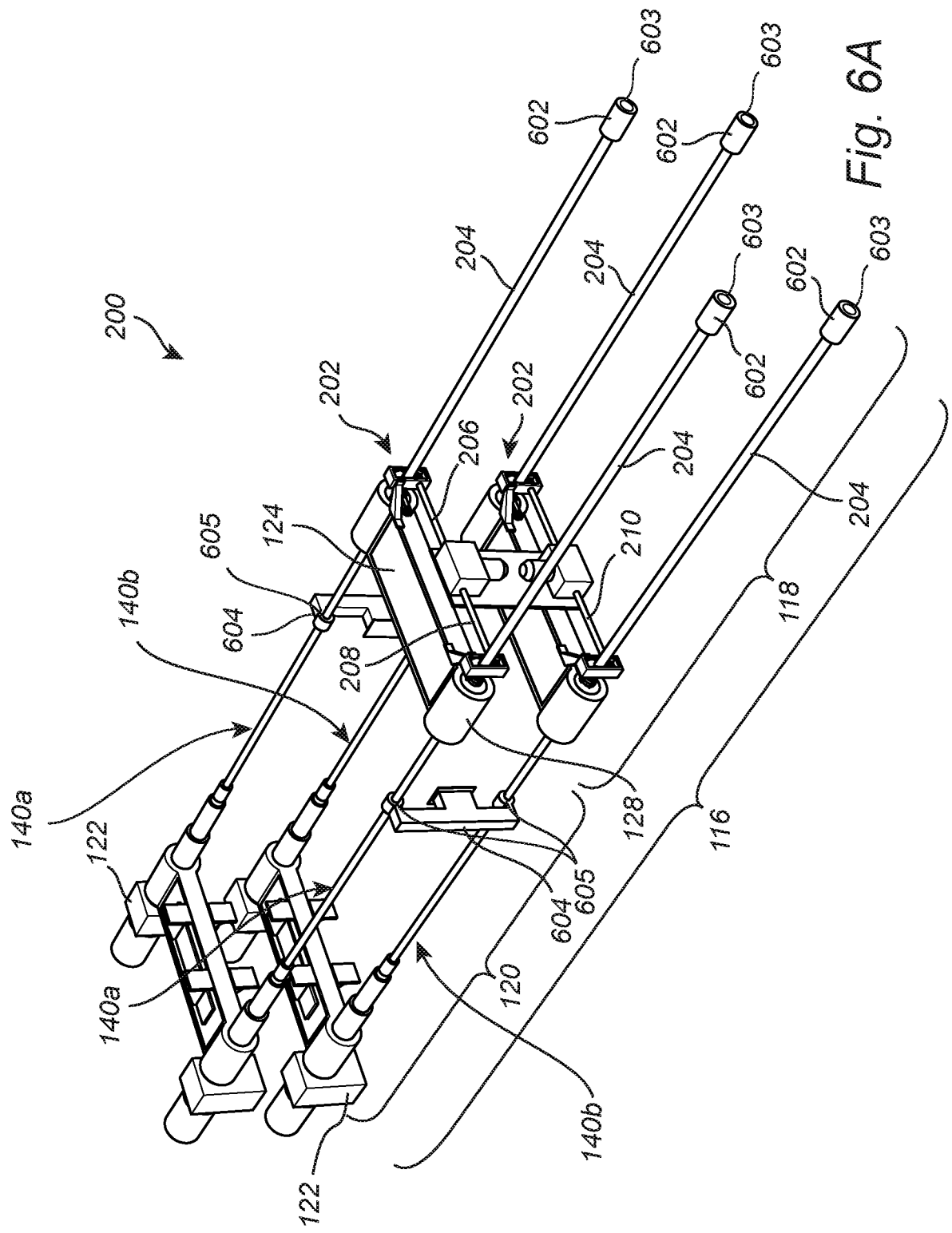
FIG. 6A is a perspective view of a filter plate compression and transport retrofitting kit for the filter press in FIG. 1 when viewed from a first end of the retrofitting kit.

The filter press 100 further comprises a stationary support structure 122 and a displaceable support structure 124, which are most clearly shown in FIGS. 6A and 6B. The stationary support structure 122 is coupled to the stationary pressure plate 108 at the front end 103 of the filter press 100. The stationary support structure 122 is coupled to the compression system 120. The displaceable support structure 124 is coupled to the displaceable pressure plate 110. The displaceable support structure 124 is coupled to the transport system 118.

The filter press 100 further comprises a support carriage (not shown) configured to be linearly displaceable along the longitudinal dimension 101. The support carriage is displaceable by means of a plurality of support wheels configured to roll on top of the longitudinally extended side beams 106 of the filter press 100. The support carriage thus supports and carries the displaceable pressure plate 110. In the example embodiment, the displaceable support structure 124 is attached directly to the displaceable pressure plate 110, which in turn is carried by the support carriage.

The filter press 100 further comprises one or more further support structures 602, 604. Specifically, the one or more further support structures 602, 604 includes one or more end support structures 602 and one or more side support structures 604. The one or more end support structures 602 and the one or more side support structures 604 are fixedly attached to the filter press 100. The one or more end support structures 602 is fixedly attached to the frame 102 of the filter press 100. The one or more side support structures 604 is fixedly attached to the side beams 106 of the filter press 100. The one or more side support structures 604 is arranged to support the common actuator links 140 traverse to the longitudinal dimension 101 over the length of the filter press 100. When the compression system 120 operates, the second compression actuator element 506 and the transport actuator element 204, which is connected thereto, will displace linearly along the longitudinal dimension 101. To allow this movement with respect to the frame 102 of the filter press 100, the one or more further support structures 602, 604 each present one or more through-holes 603, 605 for receiving a respective common actuator link 140. The respective common actuator link 140 is slidably arranged in the respective through-hole 603, 605. This allows for the common actuator link 140 to be displaced in relation to the filter press 100 during displacement of the displaceable support structure 124 using the compression system 120. To facilitate displacement, each through-opening 603, 605 of each further support structure 602, 604 is equipped with bearings, such as e.g. linear-motion bearings.

FIG. 3 shows a more detailed illustration of parts of the transport system 118. In the example embodiment, the transport system 118 comprises four transport actuators 202. Each of the transport actuators 202 comprises a transport actuator element 204 and a transport actuator transmission 206. Each transport actuator element 204 extends along the longitudinal dimension 101 and rigidly connects to the compression system 120 at a respective one of four compression actuators 502 (to be discussed later). Herein, the transport actuator element 204 present a tooth rack 224 and the transport actuator transmission 206 include a tooth gear 226. The transport actuator element 204 may be cylinder shaped, as illustrated in FIG. 3, having the tooth rack 224 integrally formed on a bottom portion thereof such that the tooth rack 224 is directed downwards. The transport actuator element 204 is arranged in relation to the transport actuator transmission 206 such that the tooth gear 226 engages with the tooth rack 224.

The transport actuator transmission 206 further comprises a laterally extending upper drive shaft 208. The upper drive shaft 208 is arranged to, at each end, carry a respective tooth gear 226 for engaging a respective tooth rack 224.

The transport actuator transmission 206 further comprising a laterally extending lower drive shaft 210. The lower drive shaft 210 may be arranged to, at each end, carry, a respective tooth gear 226 for engaging a respective tooth rack 224.

The transport system 118 further comprises four rack and pinion drive support means 215. Each of the rack and pinion drive support means 215 comprises a supporting frame 216 and supporting roller 218. The supporting roller 218 is rotationally attached to the supporting frame 216. The rack and pinion drive support means 215 may be arranged on the displaceable support structure 124 (not shown in FIG. 3) such that the tooth gear 226 is arranged to rotate in parallel to the supporting roller 218 and distanced therefrom such that a gap is formed between the tooth gear 226 and the supporting roller 218, in which gap the transport actuator element 204 is received for engaging with the tooth rack 224 on one side thereof, and engage with the supporting roller 218 on an opposite side thereof. The rack and pinion drive support means 215 are present in order to support the transport actuator element 118 and keeping it in a stable position in relation to the tooth gear 226.

The transport system 118 further comprises two drive units 220. The drive units 220 are arranged to be carried by the displaceable support structure 124 for providing kinetic energy to the transport system 118. Further, each drive unit 220 is configured to transfer kinetic energy to the respective drive shaft by means of a drive unit transmission system, such as a gear box 212. As illustrated in FIG. 3, the transport system 118 is provided with two gear boxes 212 attached to a plate 214.

As further illustrated in FIG. 3, the transport system 118 is provided with two drive units 220. Thus, in FIG. 3 the transport system 118 comprises two drive units 220 and four transport actuators 202. Upon that may be the case, the upper drive unit 220 may operate the transport actuators 202 comprising the upper drive shaft 208 and the lower drive unit 220 may operate the transport actuator 202 comprising the lower drive shaft 210. The upper and lower drive shafts 208, 210 may be operated synchronously. However, the upper and lower drive shafts 208, 210 may alternatively be operated independently from one another. Operating the two drive units 220 independently from each other could be used when there is a need for exerting a somewhat higher force using one of the actuator pairs than the other. For example, it is conceivable that the plurality of filter plates 112 may show a higher resistance to pulling and/or pushing forces at the upper end than at the lower end during a displacement of the plurality of filter plates 112.

The transport system 118 may be arranged to displace the displaceable pressure plate 110 towards the stationary pressure plate 108 from the open position P1 to the closed position P2, or vice versa, along the longitudinal dimension 101. A displacement of the displaceable pressure plate 110 in a direction towards the stationary pressure plate 108 will bring the plurality of filter plates 112 together so as to close the plurality of filter plates 112. A displacement of the displaceable pressure plate 110 in a direction away the stationary pressure plate 108 will cause the plurality of filter plates 112 to be pulled away from one another so as to open the plurality of filter plates 112. The displacement of the displaceable pressure plate 110 is achieved by means of kinetic energy from the one or more drive units 220.

By having this arrangement, the transport system 118 can displace the displaceable pressure plate 110 at high and adjustable speeds and efficiently displace a large number of filter plates 112 along the side beam 106.

FIGS. 4A-4B illustrates a locking system 401 according to the present disclosure. The locking system 401 is for the example embodiment a part of the transport system 118. The locking system 401 comprises at least one locking device 402 and at least one locking portion 404. Each locking device 402 comprises at least one locking element 406 which is adapted to form a locking engagement with a respective locking portion 404. The locking element 406 may comprise a notch or groove 408 arranged on the outermost end of the locking element 406.

FIG. 4A illustrates the locking system 401 being in an unlocked position. FIG. 4B illustrates the locking system 401 being in a locked position. The locking system 401 is configured to lock the displaceable support structure 124 with respect to the transport system 118. The displaceable support structure 124 may be locked when the filter press 100 is in the closed position, as illustrated in FIG. 2.

FIGS. 4A-4B further illustrates the displaceable support structure 124. In this embodiment, the locking system 401 is arranged on the displaceable support structure 124.

FIGS. 4A-4B further illustrates a further structure part of the displaceable support structure 124, namely the guide elements 128. The guide elements 128 are configured to slidably engage with respective one of the common actuator links 140 (with the respective transport actuator element 204 in the example). The guide elements 128 are cylinder-shaped and present a trough-hole 129 for receiving the transport actuator element 204. The guide elements 128 are arranged on the displaceable support structure 124 so as to keep a fixed angular relationship between the transport actuator element 204 and the displaceable support structure 124 independent on the position of the displaceable support structure 124 along the longitudinal dimension 101.

FIG. 5 generally illustrates the filter press 100 when being in a compressed position P3, at which the filter press 100 is in a compressed state, and an example embodiment of the compression system 120. In FIG. 5, the compression system 120 comprises four electrically operated compression actuators 502 each comprising a respective planetary screw assembly 507.

Each compression actuator 502 further comprises a first compression actuator element 504 and a second compression actuator element 506. The first compression actuator element 504, also termed the compression actuator drive shaft, is rotationally arranged in the stationary pressure plate 108. The second compression actuator element 506 is coupled to the first compression actuator element 504 by means of the planetary screw assembly 507 such that the second compression actuator element 506 displaces along the longitudinal dimension 101 in response to a rotation of the first compression actuator element 504. The planetary screw assembly 507 is thus arranged for converting rotational motion to linear motion.

The planetary screw assembly 507 comprises a plurality of rollers 508. The plurality of rollers 508 is radially arrayed around the compression system drive shaft 504 and encapsulated by the hollow cylindrical portion 510 of the second compression actuator element 506. The thread of the compression system drive shaft 504 is typically identical to the internal thread of the hollow cylindrical portion 510. The rollers typically have a single-start thread with convex flanks that limit friction at the rollers' contacts with the compression system drive shaft 504 and the hollow cylindrical portion 510 of the second compression actuator element 506. The rollers 508 typically orbit the compression system drive shaft 504 as they spin and are therefore often termed planetary rollers.

As discussed above, the compression system 120 is coupled to the stationary pressure plate 108 at one side and coupled to the stationary support structure 122 on the other side. When the filter press is in the closed position P2, and the locking system 401 is activated, the compression system 120 may be arranged to exert a compression, a pulling force, on the plurality of filter plates 112. By exerting the pulling force, the plurality of filter plates 112 may be pressed against each other and the total volume of cavities 804 can be reduced.

Each of the compression actuator 502 may rigidly connect to the each respectively transport actuator 202 such that a common actuator link 140, which extends linearly from the stationary pressure plate 108 to the displaceable pressure plate 110 along the longitudinal dimension, may be formed.

The compression system 120 may comprise one or more drive units 512 for providing kinetic energy to the displaceable support structure 124 for displacing the displaceable pressure plate 110 along the longitudinal dimension 101. The one or more drive units 512 may comprise one or more electric motors.

FIGS. 1-5 illustrates that the filter press 100 comprises a transport system 118, a compression system 120 and a locking system 401. The locking system 401 is adapted to lock the displaceable pressure plate 110 in the closed position P2 prior to compression using the compression system 120. The filter press 100 will be in the closed state and the displaceable support structure 124 in the closed position P2 when the locking system 401 is activated. After the locking system 401 has been activated to lock the displaceable support structure 124 with respect to the transport actuator element 204, the compression system 120 may be activated to exert a pulling force, a compression, on the plurality of filter plates 112 thereby pressing them against each other and sealing them tightly together to ensure that the filtration process can be performed without leakage.

Figure 7:
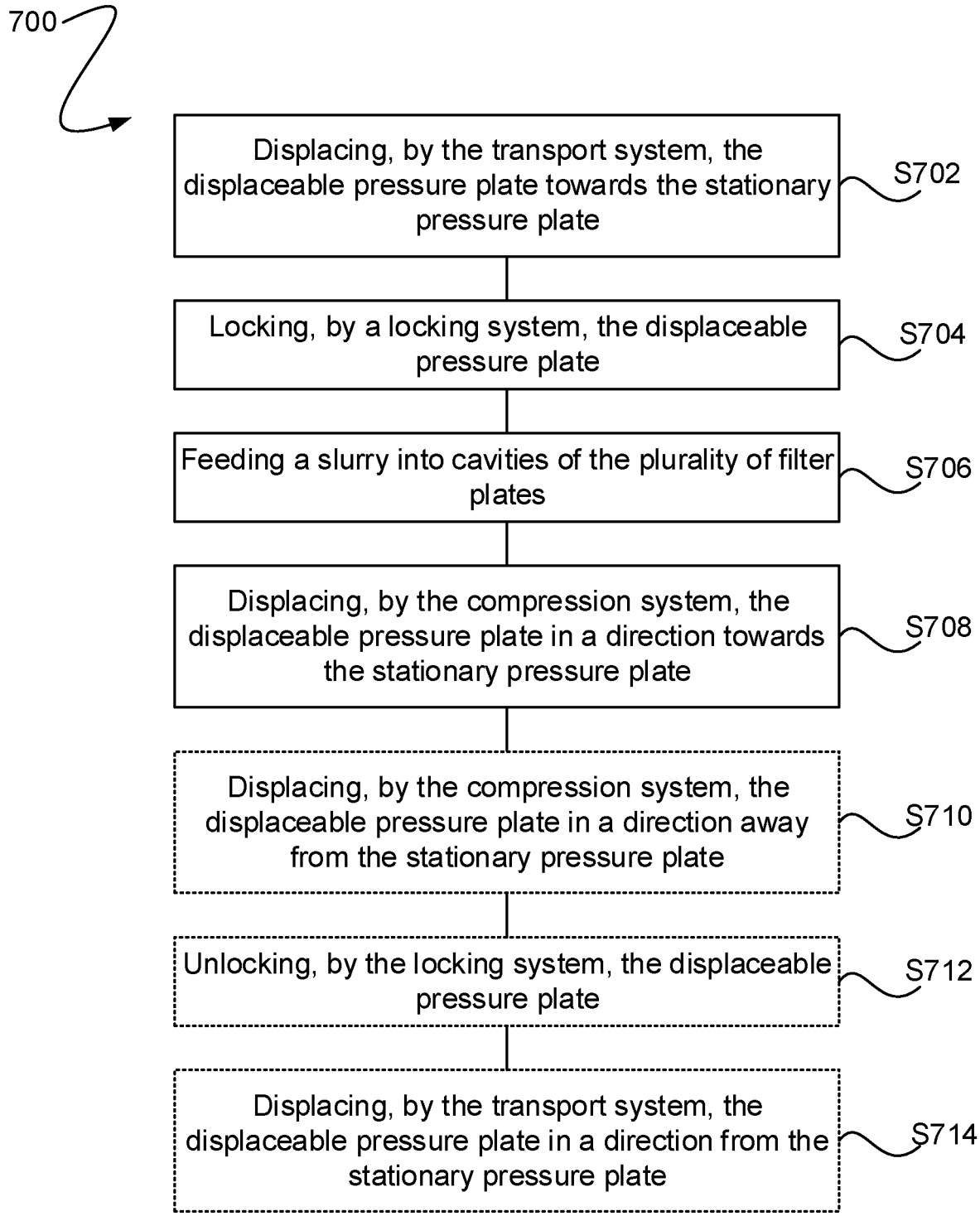
FIG. 7 is a schematic flow chart of a method for controlling a filter press according to the disclosure.

With reference to FIG. 7, a schematic flow chart representation of a method 700 for controlling the filter press 100 will be described. The method 700 comprises the following steps: The method 700 includes a step of displacing S702 the displaceable pressure plate 110, by the transport system 118, in a direction towards the stationary pressure plate 108. The displaceable pressure plate 110 is thus displaced S702 from the open position P1 to the closed position P2. In the open position P1, the filter plates 802 of the plurality of filter plates 112 are mutually separated from each other and, in the closed position P2, the filter plates 802 of the plurality of filter plates 112 are mutually in abutment with each other. In FIG. 8A, the open position P1 is illustrated. Thus, it is illustrated two filter plates 802 of the plurality of filter plates 112, wherein the filter plates 802 are separated from each other. In FIG. 8B, the closed position P2 is illustrated. Thus, it is illustrated two filter plates 802 of the plurality of filter plates 112, wherein the filter plates 802 are mutually in abutment with each other.

Further, during the step of displacing S702 the displaceable pressure plate 110 from the open position P1 to the closed position P2 using the transport system 118, the compression system 120 is inactive. The step of displacing S702 the displaceable pressure plate 110 by the transport system 118 comprises displacing the displaceable pressure plate 110 in response to rotation motion of at least one tooth gear 226 of the rack and pinion drive assembly 222.

Further, the displaceable pressure plate 110 is locked S704, by the locking system 401. The displaceable pressure plate 110 is locked 704 in relation to the transport system 118.

Thereafter, a slurry 808 is fed S706 into cavities 804 formed between mutually facing surfaces 803 of adjacent pairs of filter plates 806 of the plurality of filter plates 112. The slurry 808 may comprise a mix of solid components 812 and liquid components 810 as discussed above. In FIG. 8C, it is illustrated how the slurry 808 is fed into cavities 808 formed between the filter plates 802 of the plurality of filter plates 112.

Next, the displaceable pressure plate 110 is displaced S708, by the compression system 120, in a direction towards the stationary pressure plate 108. The displaceable pressure plate 110 is displaced S708 from the closed position P2 to the compressed position P3. The displaceable pressure plate 110 is displaced to the compressed position P3 so as to reduce the volume of the cavities 804, whereby at least a part of the liquid components 810 is forced to move from the cavities 804 into the filter plates 802 for separating the solid components 812 from the at least a part of the liquid components 810 of the slurry 808. In FIG. 8D, the compressed position P3 is illustrated. Thus, it is illustrated how a part of the liquid components 810 is forced to move from the cavities 804 into the filter plates 802. From inside the filter plates 802, the part of the liquid components 810 may leave the filter plates 802 by an outlet system (not shown).

Further, during the step of displacing S708 the displaceable pressure plate 110 from the closed position P2 to the compressed position P3 using the compression system 120, the transport system 118 is inactive. The step of displacing S708 the displaceable pressure plate 110 by the compression system 120 comprises displacing the displaceable pressure plate 110 in response to rotation motion of the planetary screw assembly 507.

The steps discussed above describe a closing process of the filter press, wherein the displaceable pressure plate 110 is displaced from the open position P1 towards the compressed position P3 with the end result of separating the solid components 812 from the at least a part of the liquid components 810 of the slurry 808. From here on an opening process will be described, wherein the displaceable pressure plate 110 is displaced from the compressed position P3 towards the open position P1.

The method 700 further comprises, displacing S710 the displaceable pressure plate 110, by the compression system 120, away from the stationary pressure plate 108. The displaceable pressure plate 110 is then displaced S710 from the compressed position P3 to the closed position P2.

Thereafter, the displaceable pressure plate 110 is unlocked S712, by deactivating the locking system 401. The displaceable pressure plate 110 is unlocked S712 in relation to the transport system 118.

Figure 8E:
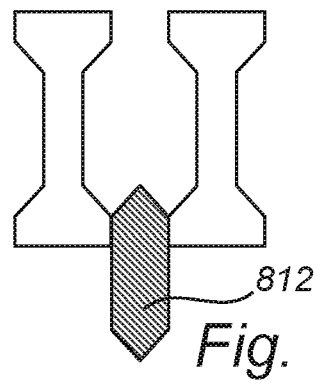

Next, the displaceable pressure plate 110 may be displaced S714, by the transport system 118, in a direction away from the stationary pressure plate 108. The displaceable pressure plate 110 is then displaced S714 from the closed position P2 to the open position P1, so as to mutually separate the plurality of filter plates 112 in relation to each other to open the cavities 804, thereby discharging the remaining part 812 of the slurry 808 from the filter press 100. In FIG. 8E, the open position P1 is illustrated, wherein the remaining part 812 of the slurry 808 is discharged.

According to one non-limiting example, wherein the compression system comprises two compression actuators 502 and the transport system 118 comprises two transport actuators 202, the step of displacing S702, S714 the displaceable pressure plate 110 by the transport system 118 comprises displacing the displaceable pressure plate 110 by operating the two transport actuators 202 in synchronization. Further, if having this arrangement, the step of displacing S708, S710 the displaceable pressure plate 110 by the compression system 120 comprises displacing the displaceable pressure plate 110 by operating the two compression actuators 502 in synchronization. Herein, each of the compression actuators 502 and the transport actuators 202 is arranged such that the corresponding two common actuator links 140 formed by the respective pairs of compression actuator 502 and transport actuator 202 will be located on opposite lateral sides of the filter press 100.

According to another non-limiting example, wherein the compression system comprises four compression actuators 502 and the transport system 118 comprises four transport actuators 202, the step of displacing S702, S714 the displaceable pressure plate 110 by the transport system 118 comprises displacing the displaceable pressure plate 110 by operating the four transport actuators 202 in synchronization. Further, if having this arrangement, the step of displacing S708, S710 the displaceable pressure plate 110 by the compression system 120 comprises displacing the displaceable pressure plate 110 by operating the four compression actuators 502 in synchronization.

Herein, each of the compression actuators 502 and the transport actuators 202 is arranged such that the corresponding four common linear actuator links 140 formed by the respective pairs of compression actuator 502 and transport actuator 202 mutually will be both laterally and vertically spaced from each other so as to define a pair of lower common actuator links 140a and a pair of upper common actuator links 140b.

FIGS. 6A and 6B shows a filter plate compression and transport retrofitting kit 200 for a filter press 100. Below, the filter plate compression and transport retrofitting kit 200 will for simplicity be referred to as a retrofitting kit 200 according to the present disclosure. As previously mentioned, the retrofitting kit 200 is suitable for using as a replacement for conventional displacement arrangements on a filter press 100. For simplicity, the filter press 100, which has already been disclosed in detail herein, includes the retrofitting kit 200. Therefore, most of the features and functionality of the retrofitting kit 200 has already been disclosed in relation to the filter press 100. The description here will thus be served best by detailing which features are included and which are not included in the retrofitting kit 200.

The retrofitting kit 200 comprises the stationary support structure 122 which is configured to couple to the stationary pressure plate (not shown) and the displaceable support structure 124 which is configured to couple to the displaceable pressure plate (not shown).

The retrofitting kit 200 further comprises the displacing arrangement 116 which has been previously disclosed in detail in relation to the filter press 100 and with reference to FIGS. 1-5.

The retrofitting kit 200 is configured to be mounted on a conventional filter press or as a retrofitting kit 200 for the filter press 100. For the example embodiment, the mounting of the retrofitting kit 200 will work as follows:

The stationary support structure 122 is attached to the stationary pressure plate 108 e.g. by bolts. The stationary support structure 122 comprises two support elements, but may be any number of elements.

The displaceable support structure 124 is attached with the displaceable pressure plate 110 e.g. by bolts.

The one or more further support structures 602, 604 of the retrofitting kit 200 is attached to respective parts of the filter press 100. Specifically, the one or more end support structures 602 of the retrofitting kit 200 is attached to the frame 102 of the filter press, and the one or more side support structures 604 is attached to the side beams 106.

The compression actuators 502 are attached to the stationary support structure 122, if not pre-attached at delivery. The transport actuator elements 204 are positioned so as to enter through the one or more end support structures 602, the guide elements 128 of the displaceable support structure, and the one or more side support structures 604. The transport actuator elements 204 are rigidly fastened to the compression actuators 502 so as to form the common actuator links 140 between the two support structures 122, 124.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A filter plate compression and transport retrofitting kit for a filter press,
wherein the filter press comprises a stationary pressure plate, a displaceable pressure plate and a plurality of filter plates oriented perpendicular to a longitudinal dimension of the filter press, the retrofitting kit comprising:
a stationary support structure configured to couple to the stationary pressure plate,
a displaceable support structure configured to couple to the displaceable pressure plate,
a compression system, coupled to the stationary support structure, the compression system comprising at least one electrically operated compression actuator comprising a planetary screw assembly, wherein the compression system is configured to provide a closing pressure to the filter plates, and
a transport system coupled to the displaceable support structure, the transport system comprising at least one electrically operated transport actuator comprising a rack and pinion drive assembly, and
wherein a common actuator link rigidly connects the at least one compression actuator of the compression system to the at least one transport actuator of the transport system, wherein the common actuator link extends linearly from the stationary support structure to the displaceable support structure along the longitudinal dimension.

2. The retrofitting kit according to claim 1, wherein the compression system comprises two compression actuators and the transport system comprises two transport actuators, each arranged such that, when mounted on the filter press, the corresponding two common actuator links formed by the respective pair of compression actuators and transport actuators will be located on opposite lateral sides of the filter press.

3. The retrofitting kit according to claim 1, wherein the compression system comprises four compression actuators and the transport system comprises four transport actuators, each arranged such that, when mounted on the filter press, the corresponding four common actuator links formed by the respective pair of compression actuators and transport actuators mutually will be both laterally and vertically spaced from each other so as to define a pair of lower common actuator links and a pair of upper common actuator links.

4. The retrofitting kit according to claim 1, wherein the retrofitting kit further comprises a locking system configured to lock the displaceable support structure with respect to the transport system.

5. The retrofitting kit according to claim 1, wherein the retrofitting kit further comprises, for each respective pair of compression actuators and transport actuators: one or more further support structures configured to be attachable to the filter press so as to support the respective pair of compression actuators and transport actuators traverse to the longitudinal dimension over the length of the filter press.

6. The retrofitting kit according to claim 1, wherein the transport system further comprises one or more drive units arranged to be carried by the displaceable support structure for providing kinetic energy to the transport system.

7. The retrofitting kit according to claim 1, wherein each compression actuator of the at least one compression actuator comprises:
a first compression actuator element rotationally arranged in the stationary support structure, and
a second compression actuator element which is coupled to the first compression actuator element by means of the planetary screw assembly such that the second compression actuator element displaces along the longitudinal dimension in response to a rotation of the first compression actuator element about the longitudinal dimension.

8. The retrofitting kit according to claim 7, wherein each transport actuator comprises:
a transport actuator element which presents a tooth rack, the transport actuator element being rigidly connected with the second compression actuator element, and
a transport actuator transmission which includes a tooth gear, the transport actuator transmission being carried by the displaceable support structure, and
wherein the transport actuator element is arranged in relation to the transport actuator transmission such that the tooth gear engages with the tooth rack.

9. The retrofitting kit according to claim 8, wherein the transport actuator transmission comprises:
a laterally extending upper drive shaft carrying, at each end thereof, a respective tooth gear for engaging a respective tooth rack of the respective one of the upper common linear actuator links, and
a laterally extending lower drive shaft carrying, at each end thereof, a respective tooth gear for engaging a respective tooth rack of the respective one of the lower common linear actuator links,
wherein the upper and lower drive shafts are operated synchronously.

10. The retrofitting kit according to claim 8, wherein the transport actuator element is cylinder shaped having the tooth rack integrally formed on a bottom portion thereof such that the tooth rack is directed downwards.

11. A method for replacing an existing compression and transport system for a filter press, the method comprising:
dismantling the existing compression and transport system of the filter press,
providing a retrofitting kit according to claim 1,
coupling, or attaching, the stationary support structure to the stationary pressure plate of the filter press,
coupling, or attaching, the displaceable support structure to the displaceable pressure plate of the filter press.

12. A filter press for separating solid components from liquid components of a slurry, the filter press comprising:
a frame;
a stationary pressure plate being coupled to the frame;
a displaceable pressure plate being displaceable along a longitudinal dimension of the filter press;
a plurality of filter plates oriented perpendicular to the longitudinal dimension of the filter press,
a compression system coupled to the stationary pressure plate, wherein the compression system comprises at least one electrically operated compression actuator comprising a planetary screw assembly, wherein the compression system is configured to provide a closing pressure to the filter plates, and
a transport system coupled to the displaceable pressure plate, wherein the transport system comprises at least one electrically operated transport actuator comprising a rack and pinion drive assembly, and wherein a common actuator link rigidly connects the at least one compression actuator of the compression system to the at least one transport actuator of the transport system, wherein the common actuator link extends linearly from the stationary support structure to the displaceable support structure along the longitudinal dimension.

13. The filter press according to claim 12, wherein the filter press further comprises:
a stationary support structure being coupled to the stationary pressure plate and to the compression system; and
a displaceable support structure being mechanically coupled to the displaceable pressure plate and to the transport system.

14. The filter press according to claim 12, wherein the compression system comprises two compression actuators and the transport system comprises two transport actuators, each arranged such that the corresponding two common actuator links formed by the respective pairs of compression actuators and transport actuators will be located on opposite lateral sides of the filter press.

15. The filter press according to claim 12, wherein the compression system comprises four compression actuators and the transport system comprises four transport actuators, each arranged such that the corresponding four common linear actuator links formed by the respective pairs of compression actuators and transport actuators mutually will be both laterally and vertically spaced from each other so as to define a pair of lower common actuator links and a pair of upper common actuator links.

16. The filter press according to claim 13, wherein each compression actuator of the at least one compression actuator comprises:
a first compression actuator element rotationally arranged in the stationary support structure, and
a second compression actuator element which is coupled to the first compression actuator element by means of the planetary screw assembly such that the second compression actuator element displaces along the longitudinal dimension in response to a rotation of the first compression actuator element about the longitudinal dimension.

17. The filter press according to claim 16, wherein each transport actuator comprises:
a transport actuator element which presents a tooth rack, the transport actuator element being rigidly connected with the second compression actuator element, and
a transport actuator transmission which includes a tooth gear, the transport actuator transmission being carried by the displaceable support structure, and wherein the transport actuator element is arranged in relation to the transport actuator transmission such that the tooth gear engages with the tooth rack.

18. A method for controlling a filter press,
wherein the filter press comprises:
a stationary pressure plate, a displaceable pressure plate and a plurality of filter plates oriented perpendicular to a longitudinal dimension of the filter press,
a compression system coupled to the stationary support structure, the compression system comprising at least one electrically operated compression actuator comprising a planetary screw assembly, wherein the compression system is configured to provide a closing pressure to the filter plates, and
a transport system coupled to the displaceable support structure, the transport system comprising at least one electrically operated transport actuator comprising a rack and pinion drive assembly,
the method comprising:
displacing, by the transport system, the displaceable pressure plate in a direction towards the stationary pressure plate from an open position, at which the filter plates of the plurality of filter plates are mutually separated from each other, to a closed position, at which the filter plates of the plurality of filter plates are mutually in abutment with each other;
locking, by a locking system, the displaceable pressure plate in relation to the transport system;
feeding a slurry which comprises a mix of solid components and liquid components into cavities formed between mutually facing surfaces of adjacent pairs of filter plates of the plurality of filter pairs;
displacing, by the compression system, the displaceable pressure plate in a direction towards the stationary pressure plate from the closed position to a compressed position so as to reduce the total volume of the cavities, whereby at least a part of the liquid component is forced to move from the cavities into the filter plates for separating the solid components from said at least a part of the liquid components of the slurry,
wherein a common actuator link rigidly connects the at least one compression actuator of the compression system to the at least one transport actuator of the transport system, wherein the common actuator link extends linearly from the stationary support structure to the displaceable support structure along the longitudinal dimension.

19. The method according to claim 18, wherein
the compression system is inactive during said displacing of the displaceable pressure plate from the open position to the closed position using the transport system, and
the transport system is inactive during said displacing of the displaceable pressure plate from the closed position to the compressed position using the compression system.

20. The method according to claim 18, wherein the step of displacing the displaceable pressure plate by the transport system and/or the step of displacing the displaceable pressure plate by the compression system comprises: converting rotational motion into linear motion.

21. The method according to claim 20, wherein the step of displacing the displaceable pressure plate by the transport system comprises: displacing the displaceable pressure plate in response to rotation motion of at least one tooth gear of the rack and pinion drive assembly.

22. The method according to claim 20, wherein the step of displacing the displaceable pressure plate by the compression system comprises: displacing the displaceable pressure plate in response to rotation motion of the planetary screw assembly.

23. The method according to claim 18, wherein the compression system comprises two compression actuators and the transport system comprises two transport actuators, each arranged such that the corresponding two common actuator links formed by the respective pairs of compression actuator and transport actuator will be located on opposite lateral sides of the filter press,
wherein said displacing of the displaceable pressure plate by the transport system comprises: displacing said displaceable pressure plate by operating said two transport actuators in synchronization; and wherein said displacing of the displaceable pressure plate by the compression system comprises: displacing said displaceable pressure plate by operating said two compression actuators in synchronization.

24. The method according to claim 18, wherein the compression system comprises four compression actuators and the transport system comprises four transport actuators, each arranged such that the corresponding four common linear actuator links formed by the respective pairs of compression actuator and transport actuator mutually will be both laterally and vertically spaced from each other so as to define a pair of lower common actuator links and a pair of upper common actuator links, wherein said displacing of the displaceable pressure plate by the transport system comprises: displacing said displaceable pressure plate by operating said four transport actuators in synchronization; and wherein said displacing of the displaceable pressure plate by the compression system comprises: displacing said displaceable pressure plate by operating said four compression actuators in synchronization.

25. The method according to claim 18, further comprising:

displacing, by the compression system, the displaceable pressure plate in a direction away from the stationary pressure plate from the compressed position to the closed position;

unlocking, by the locking system, the displaceable pressure plate in relation to the transport system;

displacing, by the transport system, the displaceable pressure plate in a direction away from the stationary pressure plate from the closed position to the open position, so as to mutually separate the plurality of filter plates in relation to each other to open the cavities, thereby discharging the remaining part of the slurry from the filter press.

* * * * *